(12) United States Patent
Okuda et al.

(10) Patent No.: US 8,086,372 B2
(45) Date of Patent: Dec. 27, 2011

(54) STEERING SUPPORT DEVICE

(75) Inventors: Yuji Okuda, Susono (JP); Seiji Kawakami, Susono (JP); Katsuhiko Iwazaki, Nishikamo-gun (JP); Hiroaki Kataoka, Susono (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 430 days.

(21) Appl. No.: 12/374,755

(22) PCT Filed: Aug. 6, 2007

(86) PCT No.: PCT/JP2007/065794
§ 371 (c)(1),
(2), (4) Date: Jan. 22, 2009

(87) PCT Pub. No.: WO2008/018610
PCT Pub. Date: Feb. 14, 2008

(65) Prior Publication Data
US 2010/0004822 A1 Jan. 7, 2010

(30) Foreign Application Priority Data
Aug. 7, 2006 (JP) ................. 2006-214754

(51) Int. Cl.
*G62D 6/00* (2006.01)
*G06F 19/00* (2006.01)
(52) U.S. Cl. ............ 701/41; 701/96; 701/301; 340/435
(58) Field of Classification Search .............. 701/41, 701/300, 301, 93, 96; 340/435; 702/157
See application file for complete search history.

(56) References Cited

U.S. PATENT DOCUMENTS
6,269,308 B1 * 7/2001 Kodaka et al. ............... 701/301
6,795,765 B2 * 9/2004 Miyahara ....................... 701/96
2001/0016798 A1 8/2001 Kodaka et al.
(Continued)

FOREIGN PATENT DOCUMENTS
DE 102 60 752 A1 7/2004
(Continued)

OTHER PUBLICATIONS
Feb. 19, 2010 Search Report issued in European Patent Application No. 07792437.1.

*Primary Examiner* — Tan Q Nguyen
(74) *Attorney, Agent, or Firm* — Oliff & Berridge, PLC (57) ABSTRACT

The present invention aims at providing a steering assistance apparatus which can accurately detect a curve exit of a running path and perform steering assistance control with an excellent running path following capability. The steering assistance apparatus of the present invention is a steering assistance apparatus 1 for providing a steering mechanism with a steering torque such that a vehicle runs along a running path according to an image capturing the running path in front of the vehicle, which estimates a curve direction of the running path by processing the image, estimates a steering direction of a driver of the vehicle according to a steering operation of the driver, and determines that the vehicle is running through a curve exit according to a fact that the estimated curve direction and steering direction do not coincide with each other. This makes it possible to determine the curve exit of the running path accurately and perform appropriate steering assistance control.

2 Claims, 11 Drawing Sheets

U.S. PATENT DOCUMENTS

| | | | |
|---|---|---|---|
| 2004/0143416 A1* | 7/2004 | Hattori et al. | 702/157 |
| 2005/0240334 A1* | 10/2005 | Matsumoto et al. | 701/93 |
| 2005/0267661 A1* | 12/2005 | Iwazaki et al. | 701/41 |
| 2006/0006021 A1 | 1/2006 | Takimoto et al. | |

FOREIGN PATENT DOCUMENTS

| | | |
|---|---|---|
| DE | 10 2004 060 030 A1 | 6/2006 |
| EP | 0 640 903 A1 | 3/1995 |
| JP | A-11-34898 | 2/1999 |
| JP | A-11-198844 | 7/1999 |
| JP | A-2000-67398 | 3/2000 |
| JP | A-2000-238652 | 9/2000 |
| JP | A-2001-10528 | 1/2001 |
| JP | A-2002-316601 | 10/2002 |
| JP | A-2005-343184 | 12/2005 |
| JP | A-2006-27301 | 2/2006 |
| JP | A-2007-38696 | 2/2007 |

* cited by examiner

STEERING SUPPORT DEVICE

TECHNICAL FIELD

The present invention relates to a steering assistance apparatus which assists steering by providing a steering mechanism of a vehicle with a steering torque.

BACKGROUND ART

Conventionally known as a steering assistance apparatus which assists steering by providing a steering mechanism of a vehicle with a steering torque is one capturing an image in front of the vehicle with a camera, detecting a running path and the position of the vehicle with respect to the running path according to the captured image information, calculating a basic steering assist torque according to the form of the running path, calculating a corrected steering assist torque according to the position of the vehicle, calculating an output steering assist torque according to the basic steering assist torque and corrected steering assist torque, and determining an amount of operation of a steering actuator according to the output steering assist torque as described in Japanese Patent Application Laid-Open No. 2001-10518. This apparatus aims at improving the accuracy of control by controlling the steering by using a form parameter of the running path and a position parameter of the vehicle which are detected with a high accuracy without employing yaw rates.

DISCLOSURE OF THE INVENTION

When a vehicle running through a curve reaches an exit of the curve, a delay may occur in turning back the steering wheel in such a steering assistance apparatus. In this case, because of the delay in turning back the steering wheel, the running of the vehicle fails to follow the running path, whereby the driver of the vehicle feels a sense of discomfort.

It is therefore an object of the present invention to provide a steering assistance apparatus which can perform steering assistance control with an excellent running path following capability by accurately detecting a curve exit.

Namely, the steering assistance apparatus in accordance with the present invention is a steering assistance apparatus for providing a steering mechanism with a steering torque such that a vehicle runs along a running path according to an image capturing the running path in front of the vehicle, the apparatus comprising curve direction estimating means for estimating a curve direction of the running path by processing the image, steering direction estimating means for estimating a steering direction of a driver of the vehicle according to a steering operation of the driver, and curve exit determining means for determining that the vehicle is running through a curve exit according to a fact that the curve direction estimated by the curve direction estimating means and the steering direction estimated by the steering direction estimating means do not coincide with each other.

In the present invention, it is determined that the vehicle is running through a curve exit according to the fact that the curve direction estimated from the image processing and the steering direction estimated from the steering operation of the driver do not coincide with each other. This can accurately determine the curve exit of the running path, whereby appropriate steering assistance control can be performed.

Preferably, the steering assistance apparatus in accordance with the present invention further comprises steering control means for making a greater amount of change in the steering torque during turning back a steering wheel when the curve exit determining means determines that the vehicle is running through the curve exit than when not.

This can enhance the amount of steering for turning back the steering wheel at the curve exit by increasing the amount of change in the steering torque when it is determined that the vehicle is at the curve exit. As a consequence, the delay in turning back the steering wheel at the curve exit can be suppressed. Therefore, the vehicle runs so as to follow the running path, which enables steering assistance control with an excellent running path following capability.

Preferably, when a curvature value of the running path calculated through the image processing incurs a predetermined level of noise or greater in the steering assistance apparatus in accordance with the present invention, even if the curve exit determining means determines that the vehicle is running through the curve exit, the steering control means keeps the amount of change in steering torque during turning back the steering wheel from becoming greater than that when not.

Here, when the curvature value of the running path calculated through the image processing incurs a predetermined level of noise or greater, even if it is determined by the curve exit determining means that the vehicle is running through the curve exit, the steering control means does not make the amount of change in steering torque during turning back the steering wheel greater than that when not, whereby inappropriate steering assistance control can be prevented from being performed under the influence of noise.

By detecting a curve exit according to the fact that the curve direction of the running path and the steering direction of the driver do not coincide with each other, the present invention can accurately detect the curve exit and perform steering assistance control with an excellent running path following capability.

BEST MODES FOR CARRYING OUT THE INVENTION

In the following, embodiments of the present invention will be explained in detail with reference to the accompanying drawings. In the explanation of the drawings, the same constituents will be referred to with the same numerals or letters while omitting their overlapping descriptions.

Figure 1:
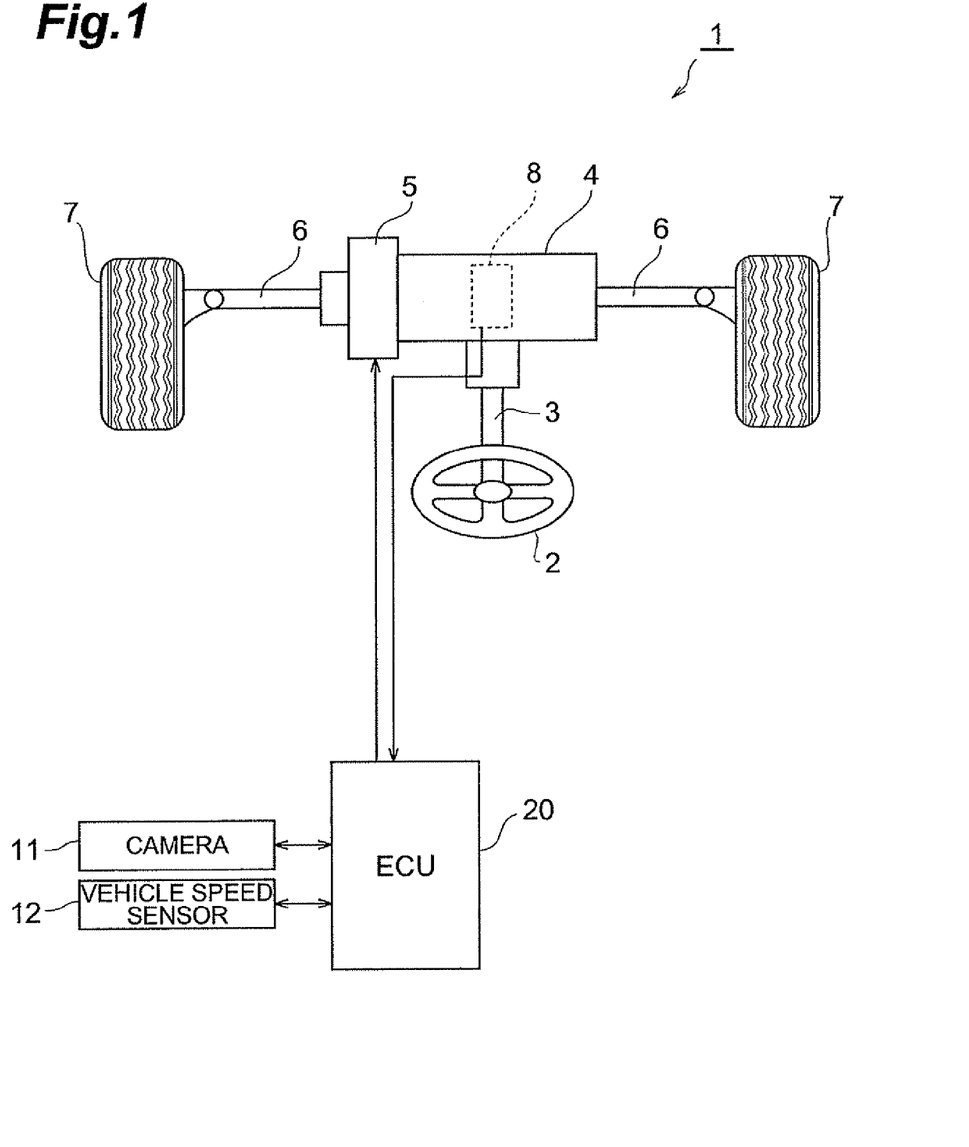
FIG. 1 is a structural schematic diagram of a steering assistance apparatus in accordance with an embodiment of the present invention.

FIG. 1 is a structural schematic diagram of the steering assistance apparatus in accordance with an embodiment of the present invention.

As shown in FIG. 1, the steering assistance apparatus 1 in accordance with this embodiment is an apparatus which assists a driver of a vehicle in steering by providing a steering force transmitting system of the vehicle with a steering torque, and used for one which performs lane-keep control for keeping the vehicle at the center position of a lane which is a running path to run, for example. The steering force transmitting system of the vehicle is mainly constituted by a steering shaft 3, a gear unit 4, and tie rods 6. The steering shaft 3 is connected to a steering wheel 2, and transmits the steering force of the steering wheel 2 to the gear unit 4 and tie rods 6.

The gear unit 4 is one which converts the steering torque transmitted from the steering shaft 3 into a horizontal force. As the gear unit 4, that of rack and pinion type is used, for example. The gear unit 4 receives an assist force from an assist motor 5 and moves the tie rods 6, so as to turn steerable wheels 7.

The gear unit 4 is provided with a torque sensor 8. The torque sensor 8 functions as steering torque detecting means which detects the steering torque of the steering wheel 2. Employed as the torque sensor 8, for example, is one in which a torsion bar (not depicted) is arranged between the steering shaft 3 and a pinion shaft (not depicted), while a torsion of the torsion bar is detected by two rotation sensors (not depicted) in response to the steering torque.

The motor 5 is one which assists the steering force of the steering wheel 2, and supplies an assist force corresponding to the steering torque or the like to the steering force transmitting system, for example. Though FIG. 1 shows the motor 5 as that of a rack assist type which provides a rack with an assist force, other types such as column assist types may also be employed.

The steering assistance apparatus 1 is provided with an ECU (Electronic Control Unit) 20. The ECU 20 performs a control process for the whole apparatus, and is constituted by a CPU, a ROM, a RAM, an input signal circuit, an output signal circuit, a power circuit, and the like, for example. The steering assistance apparatus 1 is provided with a camera 11. The camera 11, for which a CCD camera or the like, for example, is used, functions as imaging means for capturing an image in front of the vehicle. Image information captured by the camera 11 is fed into the ECU 20.

The ECU 20 functions as vehicle position detecting means for detecting the position of the vehicle with respect to the width direction of a running path (road). For example, the ECU 20 processes a captured image, recognizes a white line included in the image information, and detects the position of the vehicle with respect to the width direction of the running path according to the form and position of the recognized white line. Here, the positional deviation of the vehicle from the center position of the lane is referred to as offset.

The ECU 20 also functions as vehicle orientation detecting means which detects the orientation of the vehicle with respect to the white line of the running path according to the image information. For example, the ECU 20 processes the captured image, recognizes the white line included in the image information, and detects the orientation of the vehicle with respect to the while line according to the direction in which the recognized white line extends and the like.

The ECU 20 also functions as curve direction estimating means which estimates the curve direction of the running path according to the image information. For example, the ECU 20 estimates the curve direction of the running path according to the direction in which the white line extends and the like. The curve of the running path refers to those bent at a predetermined curvature or greater and encompasses corners of the running path.

The ECU 20 also functions as steering direction estimating means which estimates the steering direction of the driver of the vehicle according to a steering operation of the driver. For example, the ECU 20 detects a steering torque as the steering operation of the driver, and estimates the steering direction of the driver according to the state of steering torque.

The ECU 20 also functions as curve exit determining means which determines that the vehicle is running through a curve exit according to a fact that the curve direction estimated by the curve direction estimating means and the steering direction estimated by the steering direction estimating means do not coincide with each other. Further, the ECU 20 functions as steering control means which increases an amount of change in the steering torque during turning back a steering wheel when the curve exit determining means determines that the vehicle is running through the curve exit than when not.

The steering assistance apparatus 1 is provided with a vehicle speed sensor 12. The vehicle speed sensor 12 functions as vehicle speed detecting means which detects the running speed of the vehicle. For example, a wheel speed sensor is used as the vehicle speed sensor 12.

Figure 2:
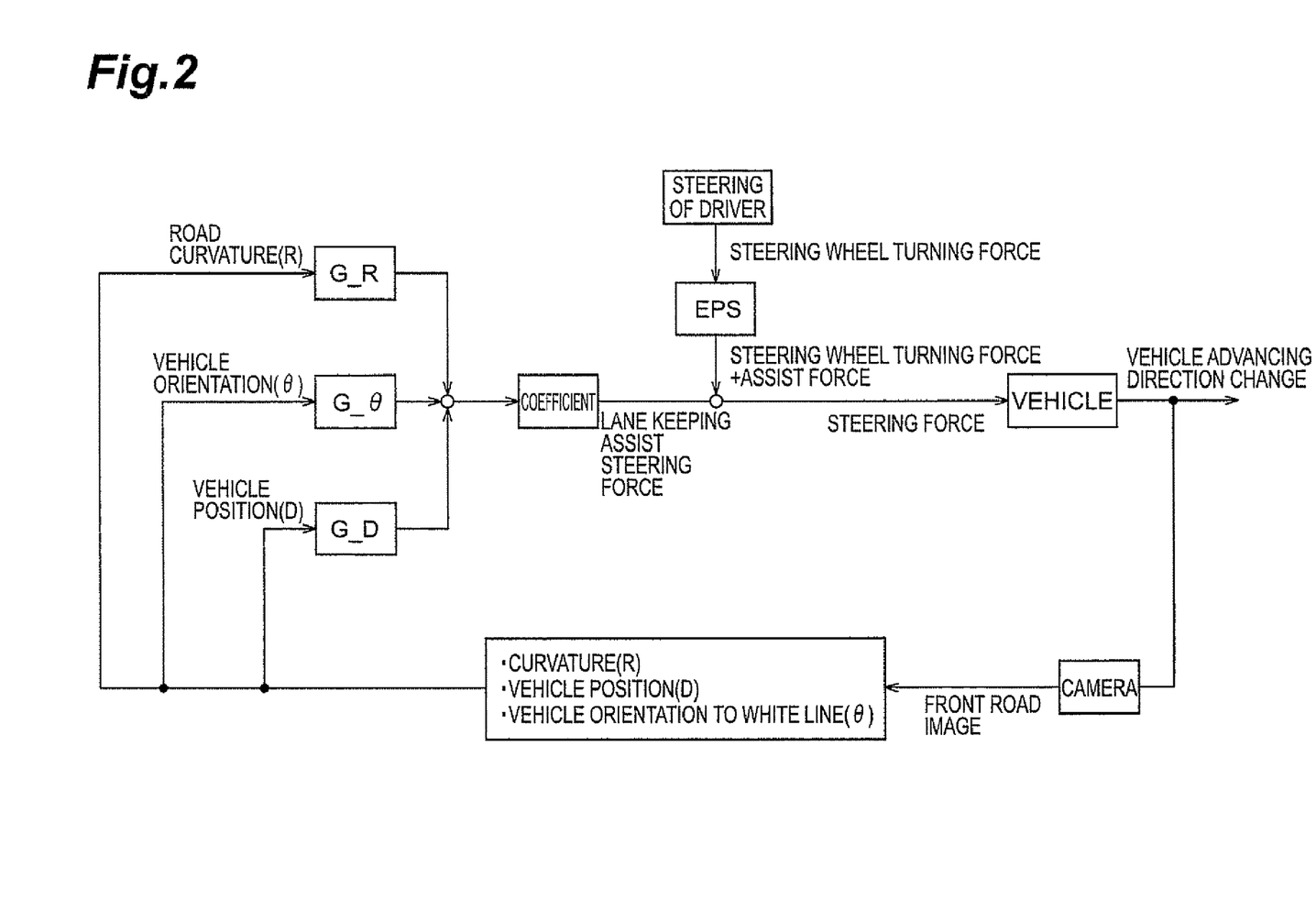
FIG. 2 is a block diagram of steering assistance control in the steering assistance apparatus of FIG. 1.

FIG. 2 is a schematic diagram of a basic control block for steering assistance control in the steering assistance apparatus 1 in accordance with this embodiment.

In the steering assistance apparatus 1, as shown in FIG. 2, the image information of the running path in front of the vehicle captured by the camera 11 is fed into the ECU 20, and the curvature of the running path (R), the vehicle position (D), and the orientation of the vehicle with respect to the white line (θ) are detected according to the image information. The curvature of the running path is calculated, for example, by extracting a white line in the running path and detecting the curvature of the white line. Thus calculated curvature value is processed through a filter, since it includes noise. The filter processing restrains the ratio of change in the curvature value from increasing.

The vehicle position is the position of the vehicle with respect to the width direction of the running path. The vehicle position is calculated according to the state of detection of the white line, for example. The orientation of the vehicle with respect to the white line is calculated according to the state of detection of left and right white lines, for example.

The curvature of the running path, the vehicle position, and the vehicle orientation are multiplied by a predetermined gain (G) and then used for calculating a target lateral acceleration. The target lateral acceleration is a lateral acceleration required for returning the vehicle to the center of the lane. By multiplying the target lateral acceleration by a predetermined coefficient, a steering torque (assist steering force) required for keeping the lane is calculated. This steering torque is fed to the steering mechanism.

On the other hand, in response to the steering wheel turning force of the driver of the vehicle, the actuator (motor 5) of electric power steering (EPS) provides an assist force. Then, the actuator of the electric power steering supplies the steering wheel turning force and assist force to the steering mechanism.

The steering wheel turning force, the assist force for turning the steering wheel, and the assist steering force for keeping the lane are fed as a steering force to the steering mechanism. In response to the steering force, the vehicle changes its advancing direction.

Figure 3:
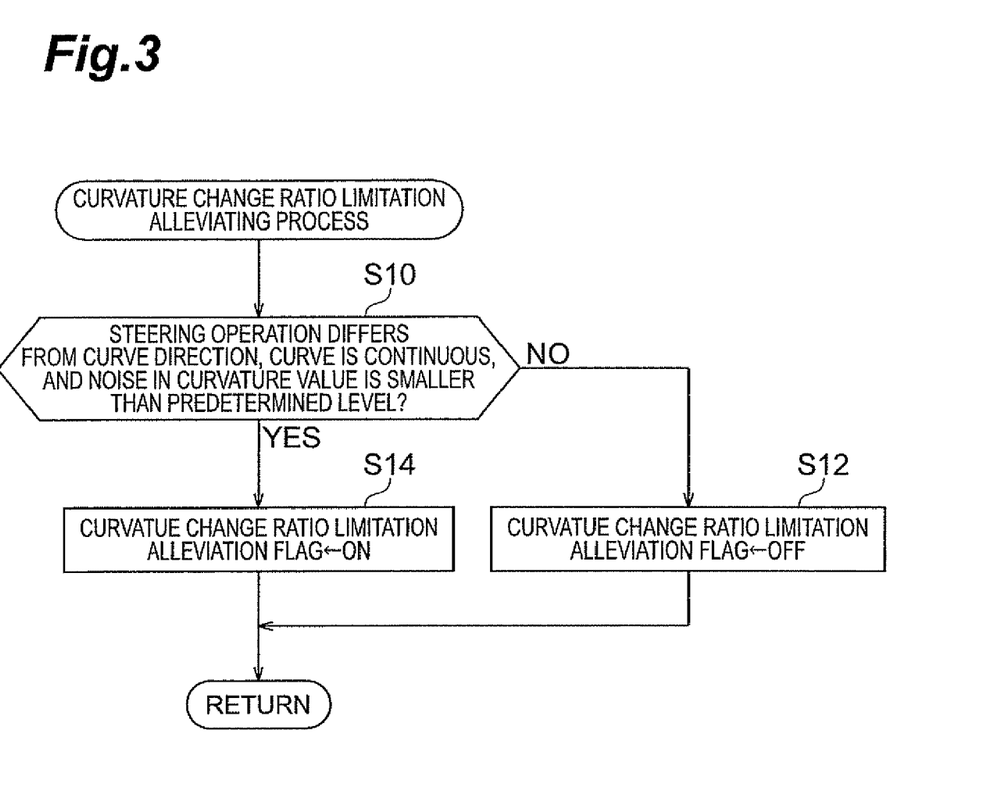
FIG. 3 is a flowchart showing a curvature change ratio limitation alleviating process in the steering assistance apparatus of FIG. 1.

FIG. 3 is a flowchart showing a curvature change ratio limitation alleviating process in the steering assistance apparatus 1 in accordance with this embodiment.

The curvature change ratio limitation alleviating process is a process for setting (turning ON) or resetting (turning OFF) a curvature change ratio limitation alleviation flag. A series of control processes in FIG. 3 are repeatedly executed by the ECU 20 with a predetermined period, for example.

First, as shown in S10 of FIG. 3, it is determined whether or not the steering operation of the driver of the vehicle differs from that toward the curve direction, the curve of the running path is continuous, and the noise in the curvature value of the running path detected from the captured image is lower than a predetermined level.

Whether or not the steering operation of the driver of the vehicle differs from that toward the curve direction is determined by comparing the curve direction of the running path with the steering direction of the driver. When the steering direction of the driver does not coincide with the curve direction of the running path, it is determined that the steering operation of the driver of the vehicle differs from that toward the curve direction. When the steering direction of the driver coincides with the curve direction of the running path, it is determined that the steering operation of the driver of the vehicle is that toward the curve direction.

Specifically, it is determined that the steering operation of the driver of the vehicle differs from that toward the curve direction when the previous value of a curve direction flag is right and a right-turn steering flag is OFF or when the previous value of curve direction flag is left and a left-turn steering flag is OFF. On the other hand, it is determined that the steering operation of the driver of the vehicle is that toward the curve direction when the previous value of curve direction flag is right and the right-turn steering flag is ON or when the previous value of curve direction flag is left and the left-turn steering flag is ON.

Whether the curve of the running path is continuous or not is determined, for example, by subjecting the captured image of the camera 11 to image processing and arithmetic operations, so as to calculate the curvature of the running path. When the curvature is a set curvature or greater, it is determined that the curve is continuous. When the curvature of the running path is smaller than the set curvature, it is determined that the curve is discontinuous. Specifically, it is determined that the curve of the running path is continuous and not when a curve continuation flag is ON and OFF, respectively.

Whether the noise in the curvature value of the running path detected from the captured image is lower than a predetermined level or not is determined according to whether or not the curvature value at the curve exit of the running path calculated according to the image captured by the camera 11 fluctuates by a set value or more. For example, it is determined according to whether a curve exit error determination flag is OFF or not.

When it is determined at S10 that the steering operation of the driver of the vehicle is that toward the curve direction, the curve of the running path is discontinuous, or the noise in the curvature value of the running path detected from the captured image is at a predetermined level or greater, the curvature change ratio limitation alleviation flag is turned OFF (S12). Namely, when the steering operation of the driver of the vehicle is that toward the curve direction, it is determined that the vehicle is not at the curve exit.

When the curvature change ratio limitation alleviation flag is turned OFF, the limitation to the change ratio is not alleviated in the curvature value of the running path that is repeatedly calculated with a predetermined period. Namely, the noise reducing function of the filter that reduces the noise in the curvature value is kept, whereby the curvature value is restrained from fluctuating greatly.

When it is determined at S10 that the steering operation of the driver of the vehicle differs from that toward the curve direction, the curve of the running path is continuous, or the noise included in the curvature value of the running path detected from the captured image is lower than the predetermined level, the curvature change ratio limitation alleviation flag is turned ON (S14).

Namely, when the steering operation of the driver of the vehicle differs from that toward the curve direction and the curve of the running path is continuous, the curve is continuous, while no steering is operated toward the curve direction, whereby it is determined that the running path is the curve exit.

When the curvature change ratio limitation alleviation flag is turned ON, the limitation to the change ratio is alleviated in the curvature value of the running path that is repeatedly calculated with a predetermined period. Namely, the noise reducing function of the filter that reduces the noise in the curvature value is alleviated, whereby the curvature value is allowed to fluctuate greatly. This makes it possible to calculate the curvature value along the curve of the running path.

After setting or resetting the flag at S12 or S14, the process for controlling the curvature change ratio limitation alleviating process is terminated.

In this curvature change ratio limitation alleviating process, the curvature change ratio limitation alleviation flag is turned ON according to the fact that the steering operation of the driver of the vehicle differs from that toward the curve direction, so as to alleviate the change ratio of the curvature value of the running path. Therefore, the curvature value along the running path can be calculated at the curve exit.

When the noise in the curvature value of the running path detected from the captured image is at a predetermined level or greater, the curvature change ratio limitation alleviation flag is turned OFF, so as to keep the noise reducing function of the noise reducing filter for the curvature value, whereby inappropriate curvature values can be restrained from being calculated.

Figure 4:
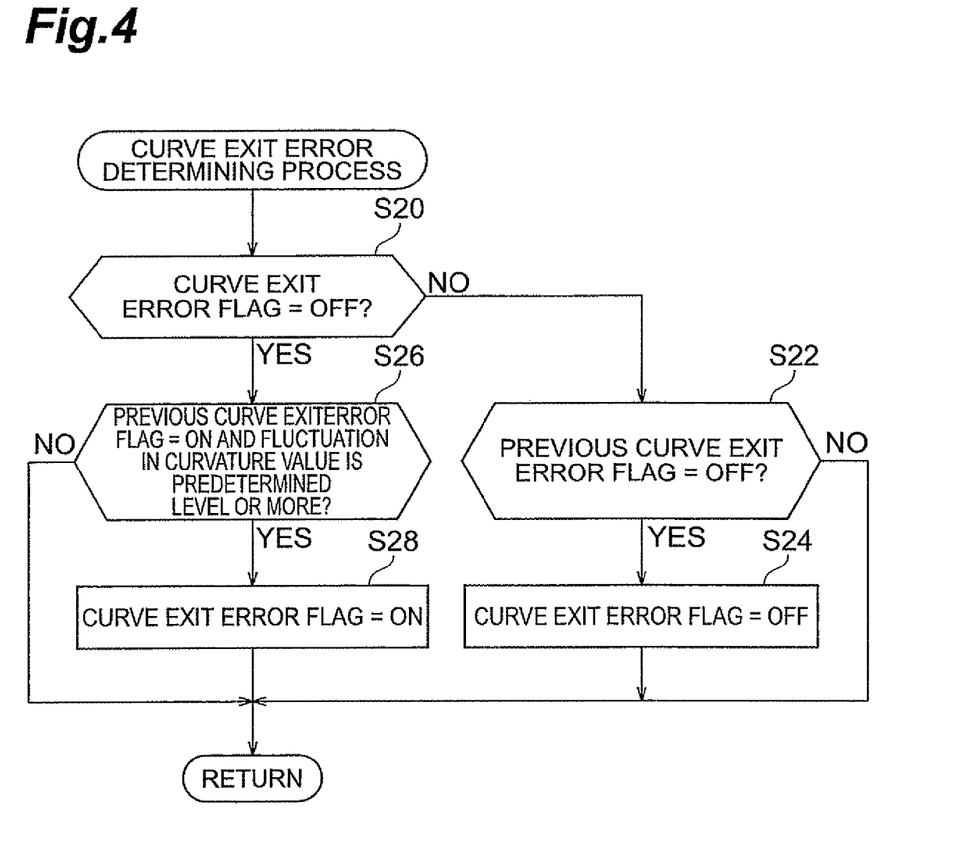
FIG. 4 is a flowchart showing a curve exit error determining process in the steering assistance apparatus of FIG. 1.

FIG. 4 is a flowchart showing a curve exit error determining process in the steering assistance apparatus 1 in accordance with this embodiment.

The curve exit error determining process is a process for setting (turning ON) or resetting (turning OFF) a curve exit error flag. The curve exit error flag is a flag which indicates that the determination of the curve exit, i.e., clothoid exit, is wrong. The determination becomes erroneous because of the noise occurring in the running path. A series of control processes in FIG. 4 are repeatedly executed by the ECU 20 with a predetermined period, for example.

First, as shown in S20 of FIG. 4, it is determined whether the curve exit error flag is OFF or not. When the curve exit error flag is not OFF at S20, it is determined whether the previous value of curve exit error flag is OFF or not (S22). When the previous value of curve exit error flag is not OFF at S22, the curve exit error determining process is terminated. When the previous value of curve exit error flag is OFF at S22, on the other hand, the curve exit error flag is turned OFF (S24).

When the curve exit error flag is OFF at S20, it is determined whether or not the previous value of curve exit error flag is ON and the curvature value of the running path incurs a predetermined level of fluctuation or more (S26). Whether or not the curvature value of the running path incurs a predetermined level of fluctuation or more is determined, for example, according to whether or not the curvature value fluctuates across a threshold indicating the curve exit. Namely, when the curvature value exceeds a set threshold soon after falling down therefrom, it is determined that the curvature value incurs a predetermined level of fluctuation or more.

When it is determined at S26 that the previous value of curve exit error flag is not ON or that the fluctuation of the curvature value of the running path is smaller than the predetermined level, the curve exit error determining process is terminated. When it is determined at S26 that the previous value of curve exit error flag is ON and that the curvature value of the running path incurs a predetermined level of fluctuation or more, the curve exit error flag is turned ON (S28). After the process at S28 ends, the curve exit error determining process is terminated.

In such a curve exit error determining process, the curve exit error flag is turned ON according to the fact that the curvature value of the running path incurs a predetermined level of fluctuation or more, whereby it can be recognized that the determination of the curve exit is erroneous.

Figure 5:
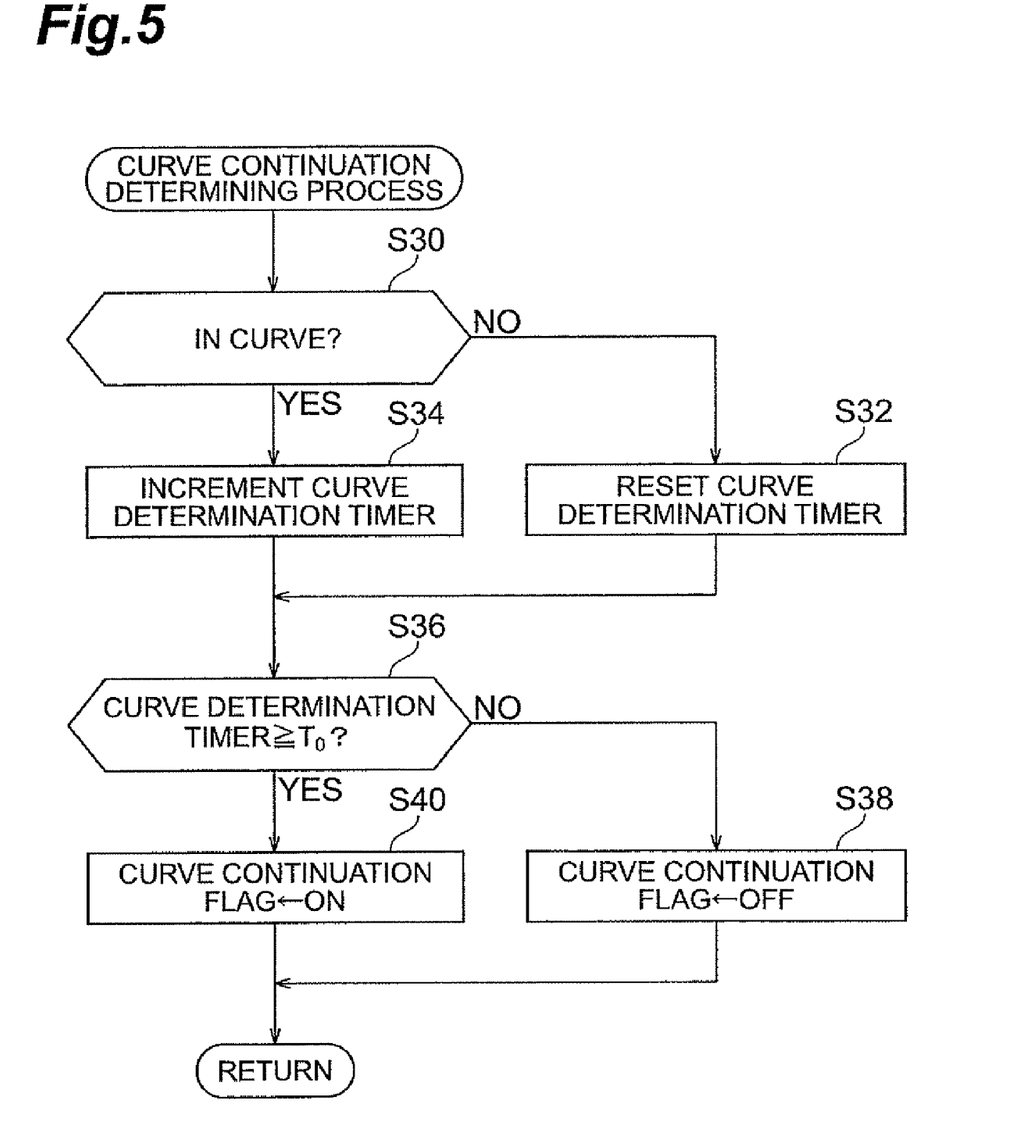
FIG. 5 is a flowchart showing a curve continuation determining process in the steering assistance apparatus of FIG. 1.

FIG. 5 is a flowchart showing a curve continuation determining process in the steering assistance apparatus 1 in accordance with this embodiment.

The curve continuation determining process is a process which determines whether or not the curve is continuous in the running path on which the vehicle runs, and sets (turns ON) or resets (turns OFF) a curve continuation flag. A series of control processes in FIG. 5 are repeatedly executed by the ECU 20 with a predetermined period, for example.

First, as shown in S30 of FIG. 5, it is determined whether the vehicle is in a curve or not. This determination is conducted according to the curvature value of the running path detected from the captured image. For example, it is determined that the vehicle is in the curve and not when the curvature value of the running path exceeds a predetermined curve threshold and not, respectively. In this case, whether the vehicle is in the curve or not may be determined according to not only the curvature value of the running path detected from the captured image, but also other kinds of information such as those about the steering torque or steering angle of the steering wheel, for example.

Preferably, a curve running flag is turned ON and OFF when the vehicle is in the curve and not, respectively, and whether the vehicle is in the curve or not is determined according to the ON/OFF state of the curve running flag.

When it is determined at S30 that the vehicle is not in the curve, a curve determination timer is reset (S32). When it is determined at S30 that the vehicle is in the curve, the curve determination timer is incremented (S34).

Then, the flow shifts to S36, where it is determined whether or not the curve determination timer T is a set time $T_0$ or more. When the curve determination timer T is less than the set time $T_0$ at S36, the curve continuation flag is turned OFF (S38). When the curve determination timer T is the set time $T_0$ or more at S36, on the other hand, the curve continuation flag is turned ON (S40). After the process at S40 ends, the curve continuation determining process is terminated.

Such a curve continuation determining process can determine whether the curve of the ruing path is continuous or not.

Figure 6:
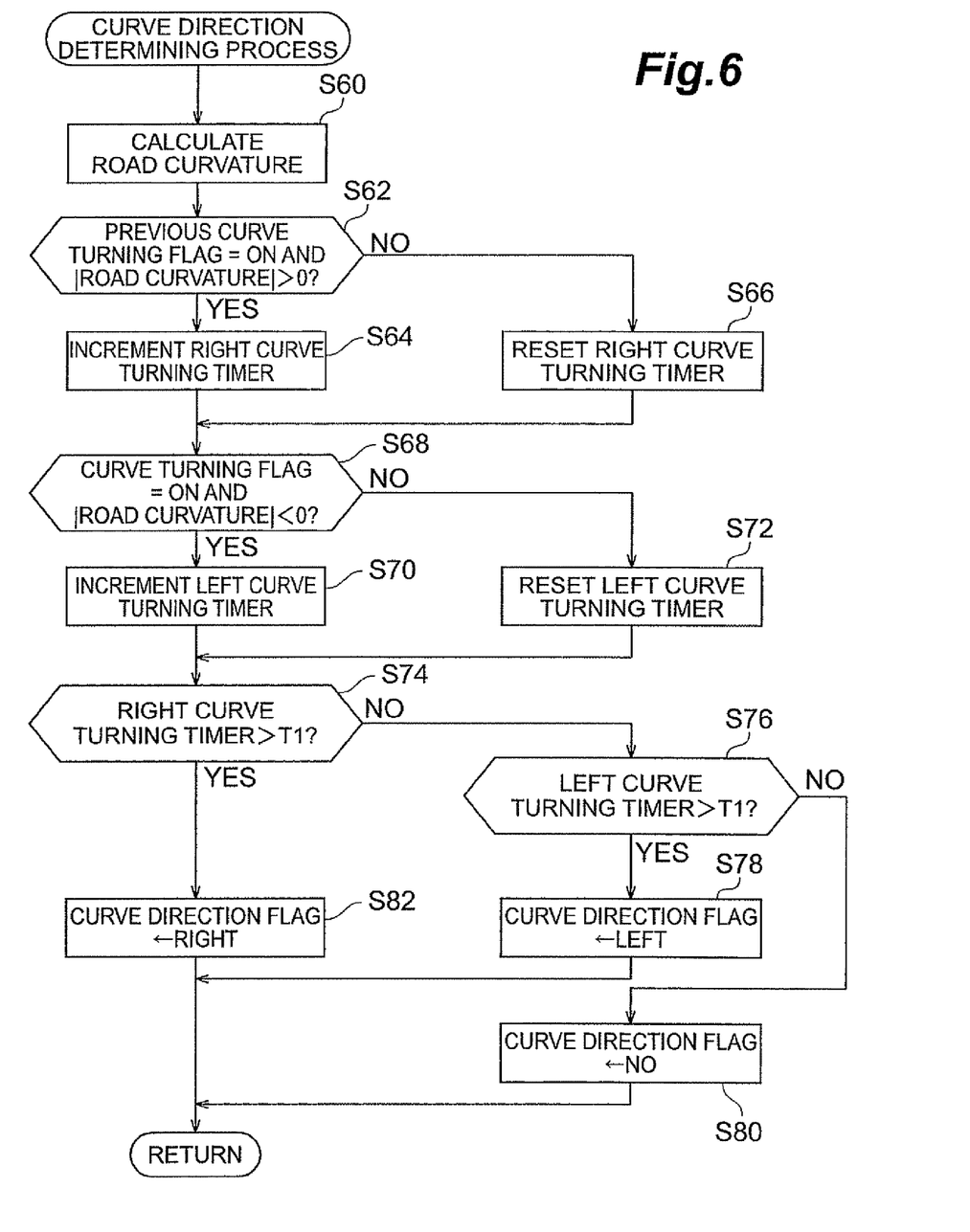
FIG. 6 is a flowchart showing a curve direction determining process in the steering assistance apparatus of FIG. 1.

FIG. 6 is a flowchart showing a curve direction determining process in the steering assistance apparatus 1 in accordance with this embodiment.

The curve direction determining process is a process which determines the curve direction of the running path on which the vehicle runs. A series of control processes in FIG. 6 are repeatedly executed by the ECU 20 with a predetermined period, for example.

First, as shown in S60 of FIG. 6, a road curvature calculating process is performed. This curvature calculating process is a process which calculates the curvature of the running path according to the image captured by the camera 11. For example, a white line in the running path is extracted from the captured image, the curvature of the white line is calculated, and the curvature of the running path is calculated according to the curvature of the white line. The curvature of the running path is calculated such that rightward and leftward curvatures are expressed with positive and negative signs, respectively.

Then, the flow shifts to S62, where it is determined whether or not a curve turning flag is ON and the road curvature is greater than zero. The curve turning flag is a flag which indicates whether the vehicle is turning or not. The ON and OFF of the curve turning flags indicate that the vehicle is turning and not, respectively.

When the curve turning flag is ON and the road curvature is greater than zero at S62, a right curve turning timer is incremented (S64). When the curve turning flag is not ON and the road curvature is not greater than zero at S62, the right curve turning timer is reset (S66).

Then, the flow shifts to S68, where it is determined whether or not the curve turning flag is ON and the road curvature is less than zero. When the curve turning flag is ON and the road curvature is less than zero at S68, a left curve turning timer is incremented (S70). When the curve turning flag is not ON and the road curvature is not less than zero, on the other hand, the left curve turning timer is reset (S72).

Then, the flow shifts to S74, where it is determined whether the right curve turning timer exceeds a time T1 or not. The time T1 is a set time which has been preset in the ECU 20. When the right curve turning timer exceeds the time T1, "right" is set to the curve direction flag (S82). The curve direction flag is a flag which indicates the curve direction of the running path. When "right" is set to the curve direction flag, it is recognized that the curve direction of the running path is rightward.

When the right curve turning timer does not exceed the time T1 at S74, on the other hand, it is determined whether the left curve turning timer exceeds the time T1 or not (S76). When the left curve turning timer exceeds the time T1, "left" is set to the curve direction flag (S78). When the left curve turning timer does not exceed the time T1 at S74, "NO" is set to the curve direction flag (S80). When "left" is set to the curve direction flag, it is recognized that the curve direction of the running path is leftward. When "NO" is set to the curve direction flag, it is recognized that the running path is neither a right curve nor a left curve, but a straight line.

Such a curve direction determining process makes it possible to determine whether the running path on which the vehicle runs is a right curve, a left curve, or a straight line. Such a curve direction determining process is an example of techniques for detecting the curve direction of the running path, so that the steering assistance apparatus 1 in accordance with this embodiment may determine the curve direction by using other techniques.

Figure 7:
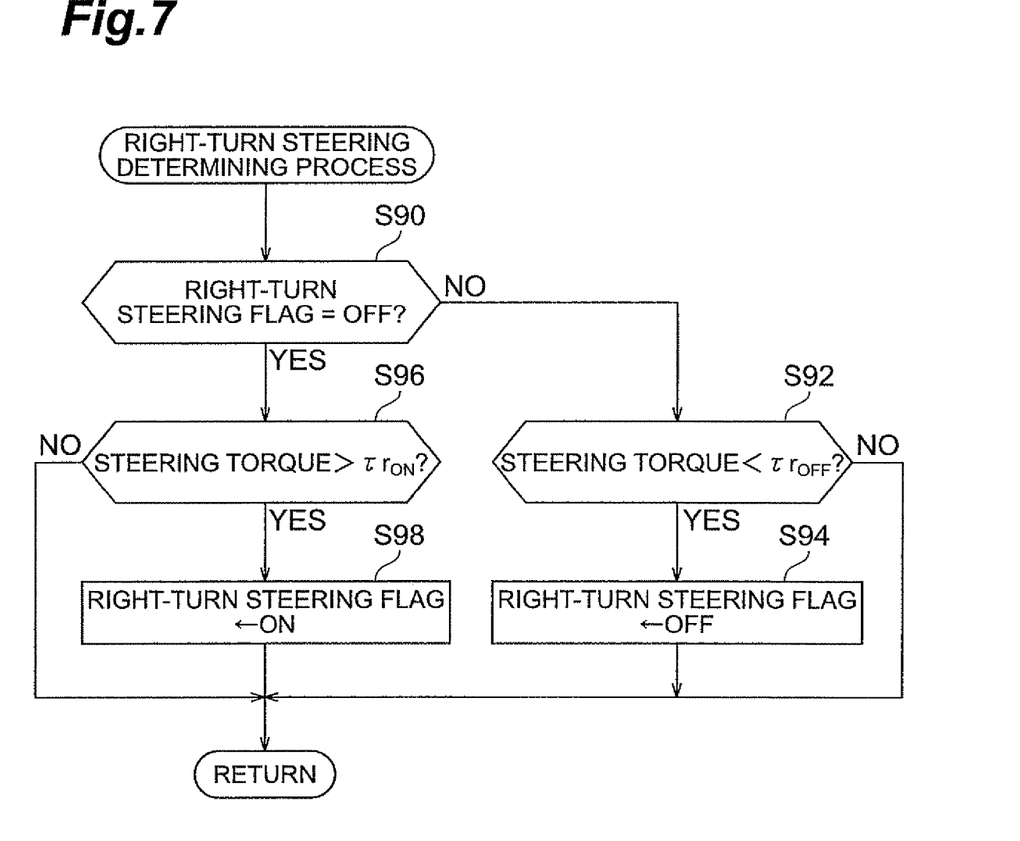
FIG. 7 is a flowchart showing a right-turn steering determining process in the steering assistance apparatus of FIG. 1.

FIG. 7 is a flowchart showing a right-turn steering determining process in the steering assistance apparatus 1 in accordance with this embodiment.

The right-turn steering determining process is a process which determines whether the driver of the vehicle is conducting right-turn steering or not. A series of control processes in FIG. 7 are repeatedly executed by the ECU 20 with a predetermined period, for example.

First, as shown in S90 of FIG. 7, it is determined whether the right-turn steering flag is OFF or not. The right-turn steering flag is a flag which indicates whether a steering wheel turning operation is a right turn or not, such that its ON and OFF represent the right turn and not, respectively.

When it is determined at S90 that the right-turn steering flag is not OFF, it is determined whether a steering torque is smaller than a torque value $\tau r_{OFF}$ or not (S92). The torque value $\tau r_{OFF}$ is a set value which has been preset in the ECU 20 as a positive value. As the steering torque, a torque value detected by the torque sensor 8 is used. This steering torque is detected, for example, such that right- and left-turn steering torques are expressed with positive and negative signs, respectively.

When the steering torque is not smaller than the torque value $\tau r_{OFF}$ at S92, it is determined that a steering wheel right-turning operation is continuously conducted, whereby the right-turn steering determining process is terminated. When the steering torque is smaller than the torque value $\tau r_{OFF}$ at S92, on the other hand, the right-turn steering flag is turned OFF (S94).

When it is determined at S90 that the right-turn steering flag is OFF, it is determined whether the steering torque is greater than a torque value $\tau r_{ON}$ or not (S96). The torque value $\tau r_{ON}$ is a set value which has been preset in the ECU 20 as a positive value greater than the torque value $\tau r_{OFF}$.

When the steering torque is not greater than the torque value $\tau r_{ON}$ at S96, it is determined that no steering wheel right-turning operation is conducted, whereby the right-turn steering determining process is terminated. When the steering torque is greater than the torque value $\tau r_{ON}$ at S96, on the other hand, it is determined that the right-turn steering is conducted, whereby the right-turn steering flag is turned ON (S98). Then, the right-turn steering determining process is terminated.

Such a right-turn steering determining process makes it possible to determine whether or not the driver of the vehicle is conducting right-turn steering according to the steering torque of the steering wheel.

Figure 8:
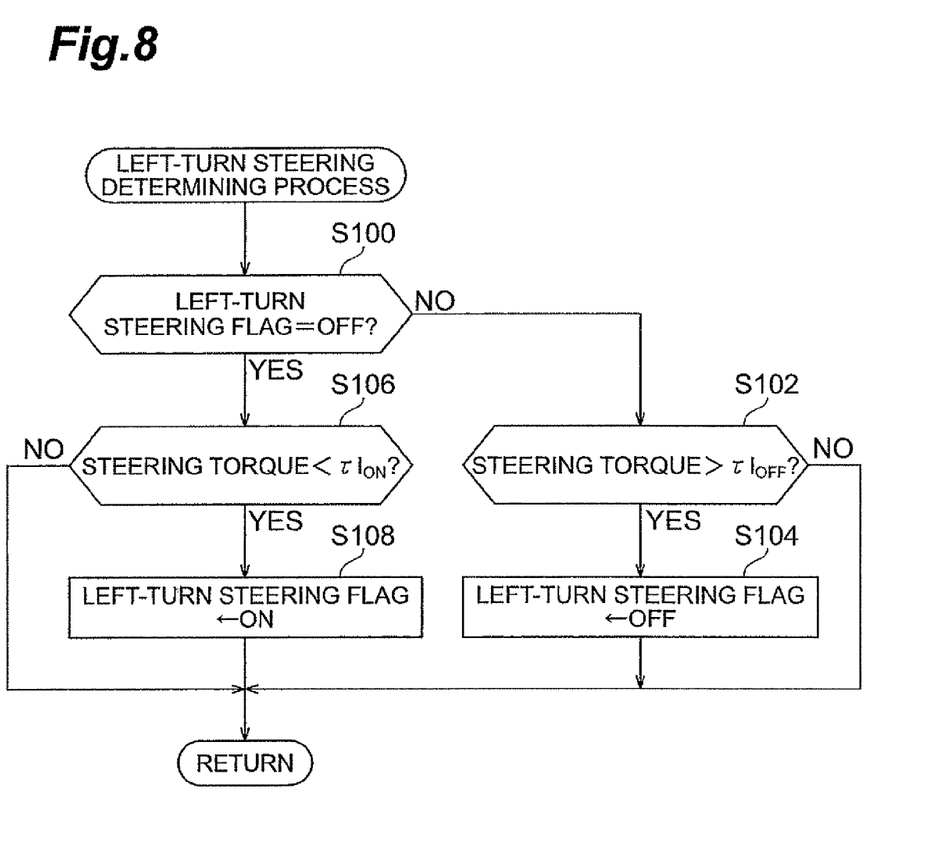
FIG. 8 is a flowchart showing a left-turn steering determining process in the steering assistance apparatus of FIG. 1.

FIG. 8 is a flowchart showing a left-turn steering determining process in the steering assistance apparatus 1 in accordance with this embodiment.

The left-turn steering determining process is a process which determines whether the driver of the vehicle is conducting left-turn steering or not. A series of control processes in FIG. 8 are repeatedly executed by the ECU 20 with a predetermined period, for example.

First, as shown in S100 of FIG. 8, it is determined whether the left-turn steering flag is OFF or not. The left-turn steering flag is a flag which indicates whether a steering wheel turning operation is a left turn or not, such that its ON and OFF represent the left turn and not, respectively.

When it is determined at S100 that the left-turn steering flag is not OFF, it is determined whether a steering torque is greater than a torque value $\tau l_{OFF}$ or not (S102). The torque value $\tau l_{OFF}$ is a set value which has been preset in the ECU 20 as a negative value. As the steering torque, a torque value detected by the torque sensor 8 is used.

When the steering torque is not greater than the torque value $\tau l_{OFF}$ at S102, it is determined that a steering wheel left-turning operation is continuously conducted, whereby the left-turn steering determining process is terminated. When the steering torque is greater than the torque value $\tau l_{OFF}$ at S102, on the other hand, the left-turn steering flag is turned OFF (S104).

When it is determined at S100 that the left-turn steering flag is OFF, it is determined whether the steering torque is smaller than a torque value $\tau l_{ON}$ or not (S106). The torque value $\tau l_{ON}$ is a set value which has been preset in the ECU 20 as a negative value smaller than the torque value $\tau l_{OFF}$.

When the steering torque is not smaller than the torque value $\tau l_{ON}$ at S106, it is determined that no steering wheel left-turning operation is conducted, whereby the left-turn steering determining process is terminated. When the steering torque is smaller than the torque value $\tau l_{ON}$ at S106, on the other hand, it is determined that the left-turn steering is conducted, whereby the left-turn steering flag is turned ON (S108). Then, the left-turn steering determining process is terminated.

Such a left-turn steering determining process makes it possible to determine whether or not the driver of the vehicle is conducting left-turn steering according to the steering torque of the steering wheel.

Figure 9:
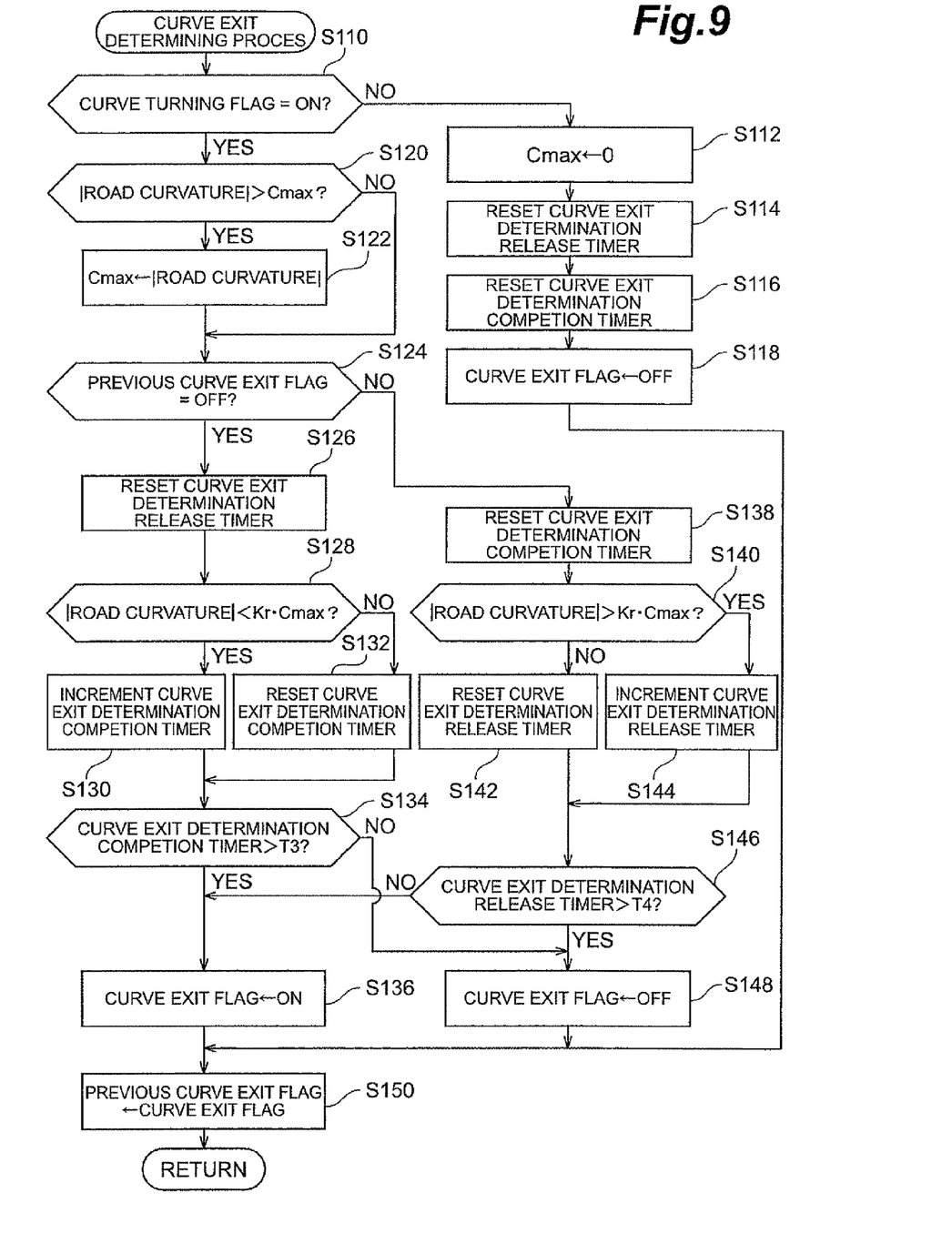
FIG. 9 is a flowchart showing a curve exit determining process in the steering assistance apparatus of FIG. 1.

FIG. 9 is a flowchart showing a curve exit determining process in the steering assistance apparatus 1 in accordance with this embodiment.

The curve exit determining process is a process which determines whether the running path (road) on which the vehicle runs is a curve exit or not. A series of control processes in FIG. 9 are repeatedly executed by the ECU 20 with a predetermined period, for example.

First, as shown in S110 of FIG. 9, it is determined whether the curve turning flag is ON or not. When the curve turning flag is not ON, zero is set to the maximum curvature value $C_{max}$ during curve running (S112). The maximum curvature value $C_{max}$ is a value which indicates the maximum curvature of the running path during when the vehicle runs through a curve, and is updated as needed during the curve riming. Subsequently, a curve exit determination release timer is reset (S114), a curve exit determination completion timer is reset (S116), and OFF is set to a curve exit flag (S118). Then, the flow shifts to S150.

When the curve turning flag is ON at S110, on the other hand, it is determined whether or not the absolute value of road curvature is greater than the maximum curvature value $C_{max}$ during the curve running (S120). When the absolute value of road curvature is not greater than the maximum curvature value $C_{max}$ during the curve running, the flow shifts to S124. When the absolute value of road curvature is greater than the maximum curvature value $C_{max}$ during the curve running, on the other hand, the absolute value of road curvature is set as the maximum curvature value $C_{max}$ (S122).

Then, the flow shifts to S124, where it is determined whether the previous value of curve exit flag is OFF or not. When the previous value of curve exit flag is OFF, the curve exit determination release timer is reset (S126). Then, it is determined whether or not the absolute value of road curvature is smaller than a value obtained by multiplying the maximum curvature value $C_{max}$ by a curve exit determination coefficient Kr (S128). The curve determination coefficient Kr is a coefficient which has been preset to a value of 0.30 to 0.40, for example, in the ECU 20 according to a state where the road can be considered straight.

When the absolute value of road curvature is not smaller than the value obtained by multiplying the maximum curvature value $C_{max}$ by the curve exit determination coefficient Kr, the curve exit determination completion timer is reset (S132). Then, the flow shifts to S134. When the absolute value of road curvature is smaller than the value obtained by multiplying the maximum curvature value $C_{max}$ by the curve exit determination coefficient Kr at S128, on the other hand, the curve exit determination completion timer is incremented (S130). Then, the flow shifts to S134.

At S134, it is determined whether the curve exit determination completion timer exceeds a third time T3 or not. The third time T3 is a set time which has been preset in the ECU 20. When the curve exit determination completion timer exceeds the third time T3, ON is set to the curve exit flag (S136). The curve exit flag is a flag which indicates that the running path on which the vehicle runs is a curve exit. The ON and OFF of the curve exit flag indicate that the running path is at the curve exit and not, respectively. When the curve exit determination completion timer does not exceed the third time T3 at S134, the flow shifts to S148, where OFF is set to the curve exit flag (S148).

When the previous value of curve exit flag is not OFF at S124, the curve exit determination completion timer is reset (S138). Then, it is determined whether or not the absolute value of road curvature is greater than the value obtained by multiplying the maximum curvature value $C_{max}$ by the curve exit determination coefficient Kr (S140). When the absolute value of road curvature is not greater than the value obtained by multiplying the maximum curvature value $C_{max}$ by the curve exit determination coefficient Kr, the curve exit determination completion timer is reset (S142). Then, the flow shifts to S146. When the absolute value of road curvature is greater than the value obtained by multiplying the maximum curvature value $C_{max}$ by the curve exit determination coefficient Kr, on the other hand, the curve exit determination completion timer is incremented (S144). Then, the flow shifts to S146.

At S146, it is determined whether the curve exit determination release timer exceeds a fourth time T4 or not. The fourth time T4 is a set time which has been preset in the ECU 20. When the curve exit determination release timer does not exceed the fourth time T4, the flow shifts to S136, where ON is set to the curve exit flag. When the curve exit determination release timer exceeds the fourth time T4, on the other hand, the flow shifts to S148, where OFF is set to the curve exit flag. Then, the flow shifts to S150.

At S150, the data of the curve exit flag is set to the previous value of curve exit flag. Then, the series of processes in the curve exit determining process are terminated.

Figure 10:
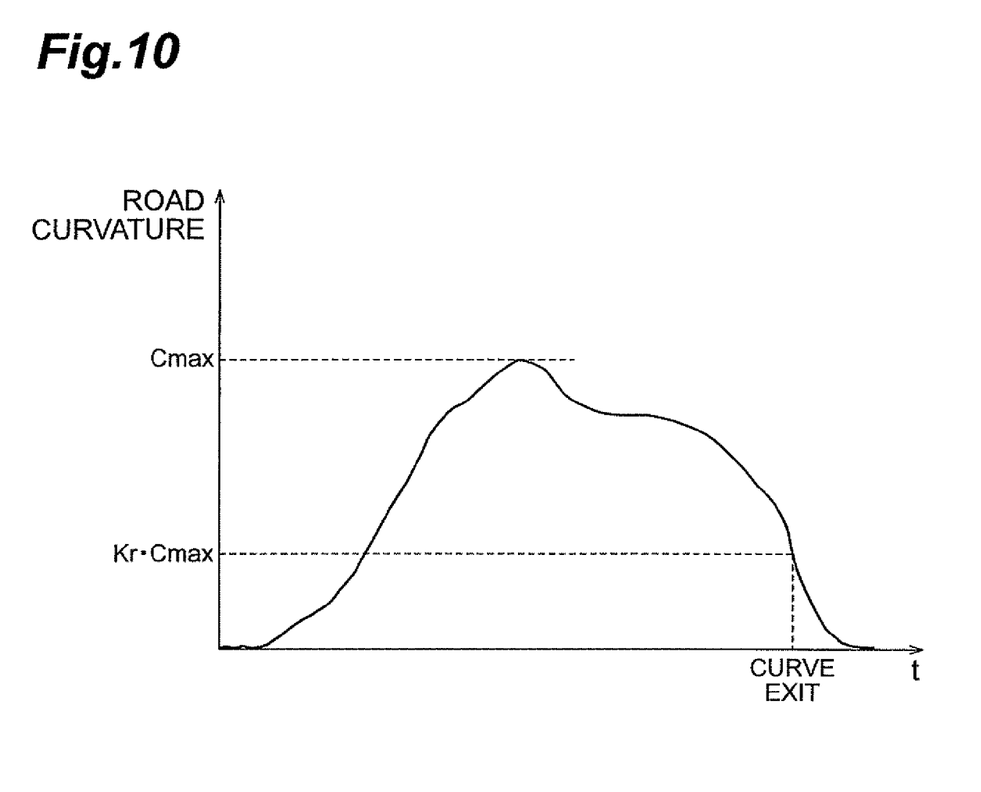
FIG. 10 is a graph showing a state of change in road curvature in the curve exit determining process of FIG. 9.

As shown in FIG. 10, such a curve exit determining process turns the curve exit flag ON when the road curvature of the running path on which the vehicle runs decreases from the maximum curvature value $C_{max}$ to the set value (Kr·$C_{max}$), and thus can detect that the running path of the vehicle is the curve exit. Such a curve exit determining process is an example of techniques for detecting a curve exit of the running path, so that the steering assistance apparatus 1 in accordance with this embodiment may determine the curve exit by using other techniques.

As in the foregoing, the steering assistance apparatus 1 in accordance with this embodiment determines that the vehicle is running through a curve exit according to the fact that the curve direction estimated from the image processing and the steering direction estimated from the steering operation of the driver do not coincide with each other. Since whether the vehicle is at the curve exit or not is determined not only from the image processing but also according to the steering operation of the driver, the curve exit of the running path can be detected accurately. This enables appropriate steering assistance control by which the vehicle runs along the running path.

When it is determined that the vehicle is at the curve exit ("Yes" at S10 of FIG. 10), the steering assistance apparatus 1 in accordance with this embodiment can enhance the amount of change in steering torque by turning the curvature change ratio limitation alleviation flag ON, so as to increase the amount of steering for turning back the steering wheel at the curve exit. This can suppress the delay in turning back the steering wheel at the curve exit. Therefore, the vehicle runs so as to follow the running path, which enables steering assistance control with an excellent running path following capability.

Figure 11:
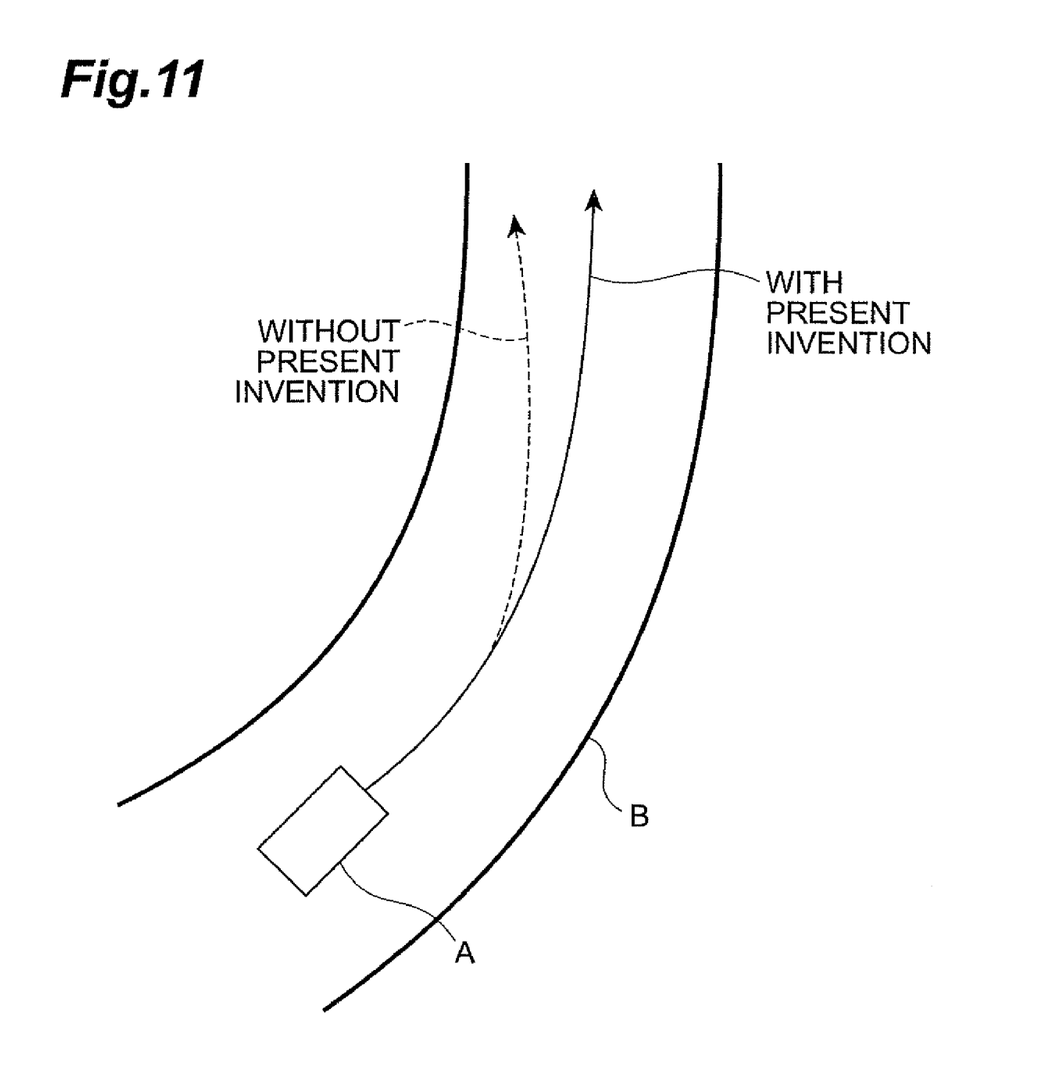
FIG. 11 is a view for explaining the running path following capability of steering assistance control in the steering assistance control apparatus of FIG. 1.

When a vehicle A runs through a curve of a running path B under steering assistance control as shown in FIG. 11, for example, one not based on the steering assistance control of the present invention cannot increase the amount of steering for turning back the steering wheel at the curve exit, since the curvature change ratio is limited, whereby it becomes difficult for the vehicle to run along the running path B. On the other hand, the present invention alleviates the limitation on the curvature change ratio at the curve exit, and thus can increase the amount of steering for turning back the steering wheel at the curve exit, thereby allowing the vehicle to run along the running path B.

Further, when the curvature value of the running path calculated through the image processing incurs a predetermined level of noise or greater ("No" at S10 of FIG. 3), even if it is determined that the vehicle is running through the curve exit, the steering assistance apparatus 1 in accordance with this embodiment turns the curvature change ratio limitation alleviation flag OFF, so as not to make the amount of change in steering torque during turning back the steering wheel greater than that when the vehicle is not at the curve exit. This can prevent inappropriate steering assistance control from being performed under the influence of noise.

The above-mentioned embodiment illustrates only an example of the steering assistance apparatus in accordance with the present invention. The steering assistance apparatus in accordance with the present invention is not limited to the above, but may be anything in which the steering assistance apparatus in accordance with the embodiment is modified or applied to others so as not to alter the gist recited in each claim.

INDUSTRIAL APPLICABILITY

By detecting a curve exit according to the fact that the curve direction of the running path and the steering direction of the driver do not coincide with each other, the present invention can accurately detect the curve exit and perform steering assistance control with an excellent running path following capability.

The invention claimed is:

1. A steering assistance apparatus for providing a steering mechanism with a steering torque such that a vehicle runs along a running path according to an image capturing the running path in front of the vehicle, the apparatus comprising:
a curve direction estimating unit to estimate a curve direction of the running path by processing the image;
a steering direction estimating unit to estimate a steering direction of a driver of the vehicle according to a steering operation of the driver;
a curve exit determining unit to determine that the vehicle is running through a curve exit according to a fact that the curve direction estimated by the curve direction estimating unit and the steering direction estimated by the steering direction estimating unit do not coincide with each other; and
a steering control unit to make a greater amount of change in the steering torque during turning back a steering wheel when the curve exit determining unit determines that the vehicle is running through the curve exit than when not.

2. A steering assistance apparatus according to claim 1, wherein, when a curvature value of the running path calculated through the image processing incurs a predetermined level of noise or greater, even if the curve exit determining unit determines that the vehicle is running through the curve exit, the steering control unit keeps the amount of change in steering torque during turning back the steering wheel from becoming greater than that when not.

* * * * *